(No Model.) 2 Sheets—Sheet 1.

J. D. WILKINSON.
HORSESHOE NAIL MACHINE.

No. 284,934. Patented Sept. 11, 1883.

WITNESSES:
D. Twitchell
C. Sedgwick

INVENTOR:
J. D. Wilkinson
BY Munn & Co
ATTORNEYS.

(No Model.) 2 Sheets—Sheet 2.

J. D. WILKINSON.
HORSESHOE NAIL MACHINE.

No. 284,934. Patented Sept. 11, 1883.

WITNESSES: Donn Twitchell, C. Sedgwick

INVENTOR: J. D. Wilkinson
BY Munn & Co.
ATTORNEYS.

UNITED STATES PATENT OFFICE.

JOHN D. WILKINSON, OF PLATTSBURG, NEW YORK, ASSIGNOR OF ONE-HALF TO JOHN M. WEVER AND WILLIS L. WEVER, OF SAME PLACE.

HORSESHOE-NAIL MACHINE.

SPECIFICATION forming part of Letters Patent No. 284,934, dated September 11, 1883.

Application filed August 30, 1882. (No model.)

*To all whom it may concern:*

Be it known that I, JOHN D. WILKINSON, of Plattsburg, Clinton county, New York, have invented an Improvement in Horseshoe-Nail Machines, of which the following is a specification.

The object of my invention is to simultaneously forge two nails, cut them apart, and leave them ready to be pointed.

Figure 1:
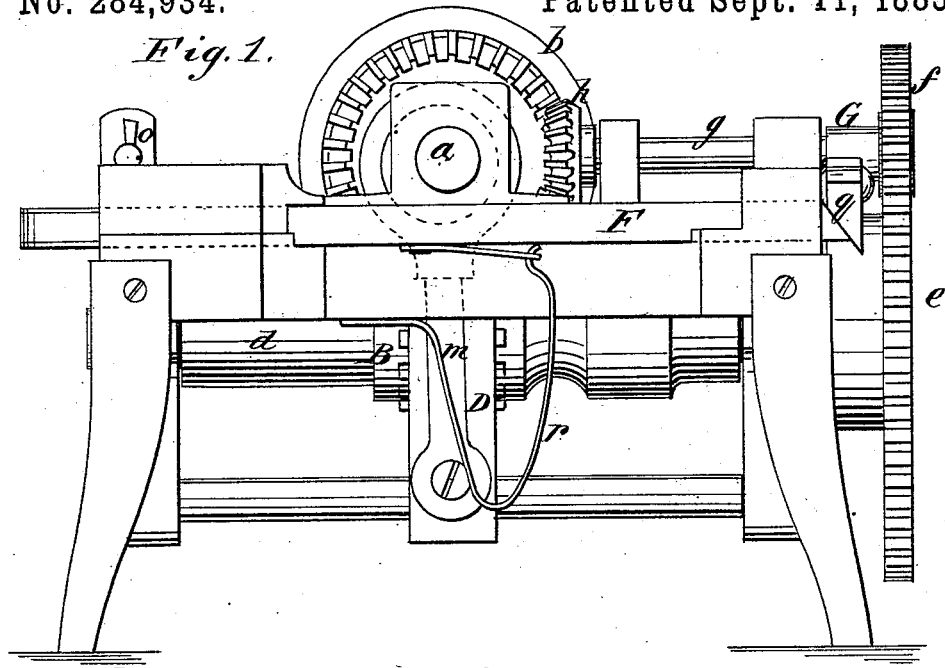
Figure 2:
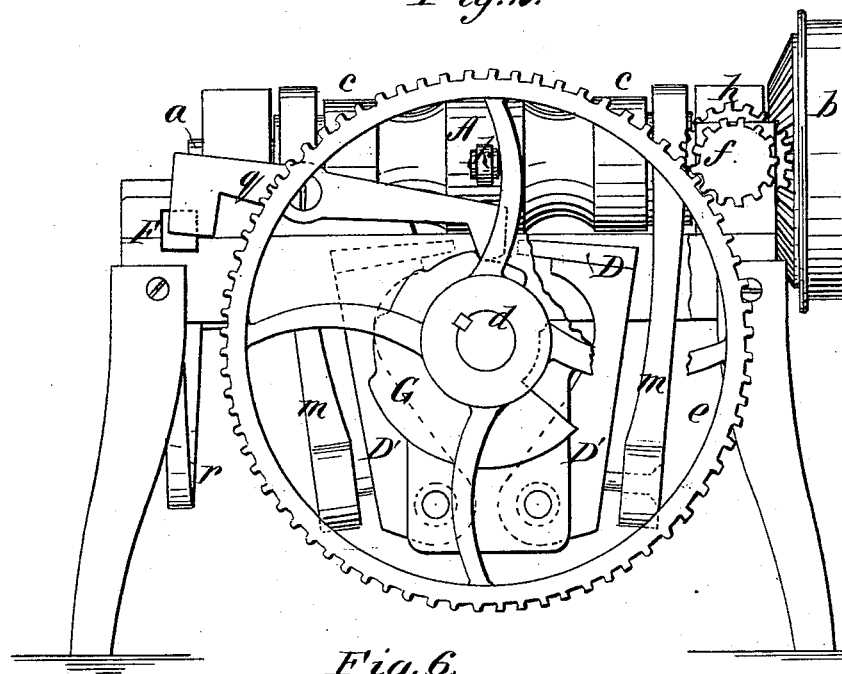
Figure 6:
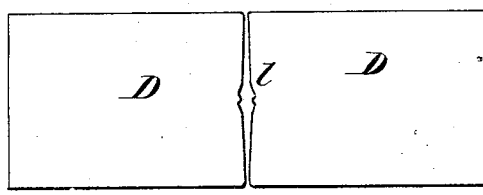
Figure 3:
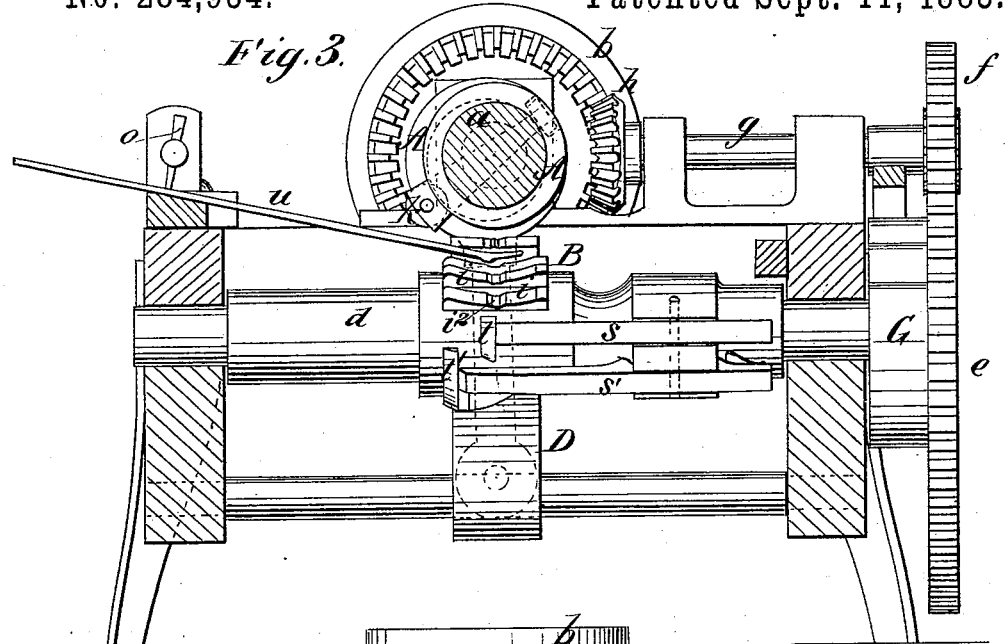
Figure 4:
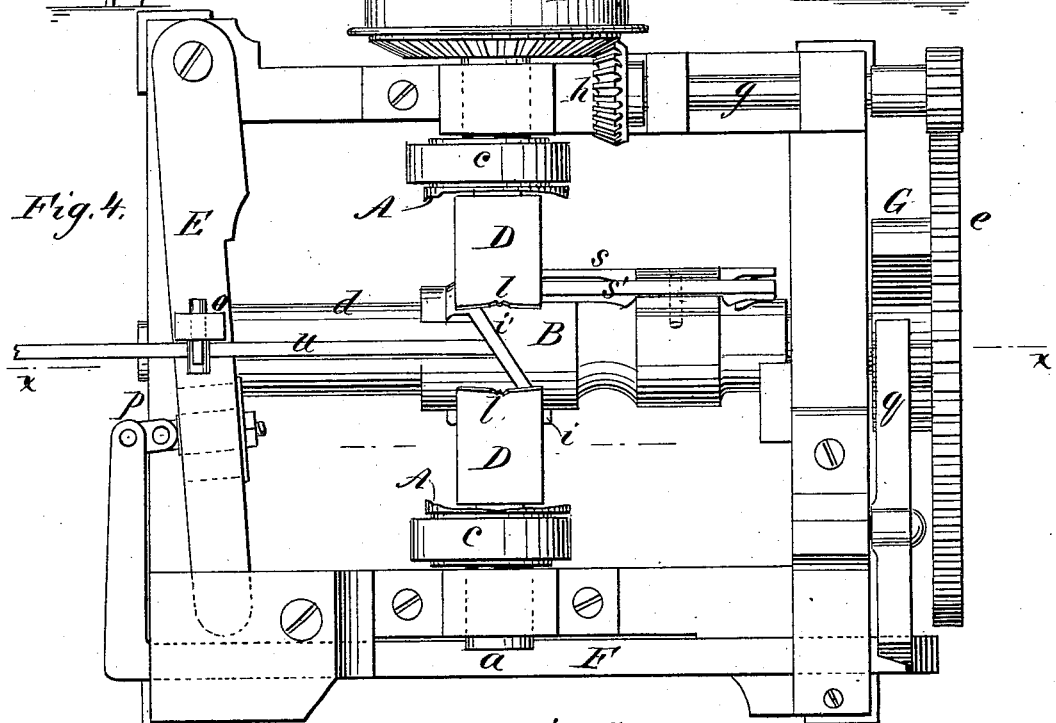
Figure 5:
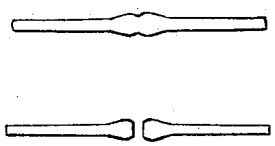

Figure 1 of the drawings is a side elevation of the machine. Fig. 2 is an elevation of a side at right angles to that in Fig. 1. Fig. 3 is a vertical section, showing the hammer, dies, and cutters in their relative position. Fig. 4 is a plan view. Fig. 5 is a detail view of the nail-blanks before and after they are severed. Fig. 6 is a detail view of the edging-dies, showing their construction.

A represents a roll having the hammer or drawing roll $k$, and carried on a rotary shaft, $a$, whereon is the pulley $b$, to be connected with the power; and $c\ c$ are eccentrics for operating the side dies.

B is a rotary anvil-block on shaft $d$, arranged beneath shaft $a$, and on this shaft is a gear-wheel, $e$, engaging a pinion, $f$, on the shaft $g$, and connecting by a beveled pinion, $h$, with a beveled-gear wheel on the hammer-shaft $a$. On block B are anvils $i$, with recesses $i^2$, of a size and shape to correspond with two heads of a horseshoe-nail arranged at equal intervals for about two-thirds of the circumference. On the remainder of the circumference are placed the gage $i'$ and the shears $t\ t$, for dividing the heads and cutting off the blank from the nail-rod.

D D are the side hammers or edgers on rock-shafts D', at opposite sides of the anvil-block. These edgers are recessed at $l$, and in the middle of the recess rises a wedge-shaped projection, so as to crease the double head in the middle, as shown in Figs. 5, 6 of the drawings. The shafts D' are connected by rods $m$ with the eccentrics $c$, so that the edging-hammers may be conveniently operated.

E is the draw-bar, having a gripper, $o$, for holding the rod, and pivoted at one end. It is connected by an adjustable link, $p$, with the end-beveled angle-bar F and a lever, $q$, operated by a cam, G, on the shaft $d$. This mechanism gives the retracting movement to the draw-bar, the cam G being provided with a step for each anvil, so as to act intermittently on the draw-bar and immediately after each blow of the hammer or drawing roll $k$, while $r$ is a spring which carries the draw-bar forward as soon as the cam G ceases to actuate the lever $q$.

The operation is as follows: The rod is placed with its end against the gage $i'$, clamped by the grippers $o$, and held in position by the spring $r$, enough metal being thus extended upon the anvil to form a double nail-blank. The metal is then forged by the drawing-hammer toward a recess, $i^2$, in the first anvil. At this point I use the well-known mechanism (which is no part of my invention) consisting of a cam in front of the gripper and attached to the anvil-shaft, and a nose-piece, through which the rod is fed. The nose-piece is raised by the cam, so as to bring the rod just high enough to receive the blow of the side hammers, when it is released in readiness for another blow from the drawing-hammer. Now the bar is retracted a distance corresponding to the elongation of the nail-blank. The grippers are moved loosely or slide upon the nail-rod as the bar E is moved by spring $r$. This operation is repeated until the blank has been face-drawn and edge-hammered the requisite number of times. The blank then passes beyond the anvils, and the double head comes across the middle shear $t$, and the two blanks are separated by cutter S. The blank which remains on the rod now comes across the edge shear $t$, and is severed by the cutter S'. These cutters S S' are pivoted at their outer ends, extend with their inner ends to shears $t$, and are operated by the hammer-roll $k$. The advantage of the diagonal gage is that by arranging it diagonally I prevent the nail-blank, which is hot and easily bent, from binding on the gage.

I am aware that drawing face hammers and edging side hammers are not new in forging-machines, and also that a double nail-blank enlarged at the middle to form two heads has been cut out in dies; but

What I claim as new and of my invention is—

1. In a nail-forging machine, the rotary anvils provided with a middle recess, $i^2$, and an upward incline on each side thereof, whereby the metal may be drawn into said recess to form a double head, as shown and described.

2. The side hammer of a horseshoe-nail-forging machine, provided with the recess $l$ and a median wedge-shaped projection, to adapt it to shape one edge of the head and body of nail, as described.

3. The combination, with the feed-bar E and the operative mechanism provided with the actuating-bar F, of the adjustable link-connection $p$, whereby the degree of the retraction of the nail-rod may be graduated, as described.

4. In a nail-forging machine, the combination, with a roll having a drawing-hammer on an arm thereof, and two opposite edging-hammers, of an intermittently-rotary block having on its surface a series of anvils, a median shear, an edge shear, and two spring-held pivoted cutters, S' S, projecting over said shears, whereby two nail-blanks may be headed, faced, edged, separated, and cut from the rod, as described.

5. The combination of the step-cam G, the lever $q$, the angle-bar F, and an end-pivoted nail-holder, whereby the nail-rod may be retracted after each drawing out, as and for the purpose described.

6. In a nail-forging machine, the combination, with a rotary anvil-block, of a gage, $i'$, arranged diagonally across the surface of the block, to prevent that part of the hot nail-blank which rests against it from binding, as described.

JOHN D. WILKINSON.

Witnesses:
A. GUIBORD,
A. M. PLATT.